No. 726,975. PATENTED MAY 5, 1903.
A. P. W. NEITHERCOTT.
COMBINED BADGE AND BOUTONNIÈRE HOLDER.
APPLICATION FILED JULY 30, 1902.
NO MODEL.
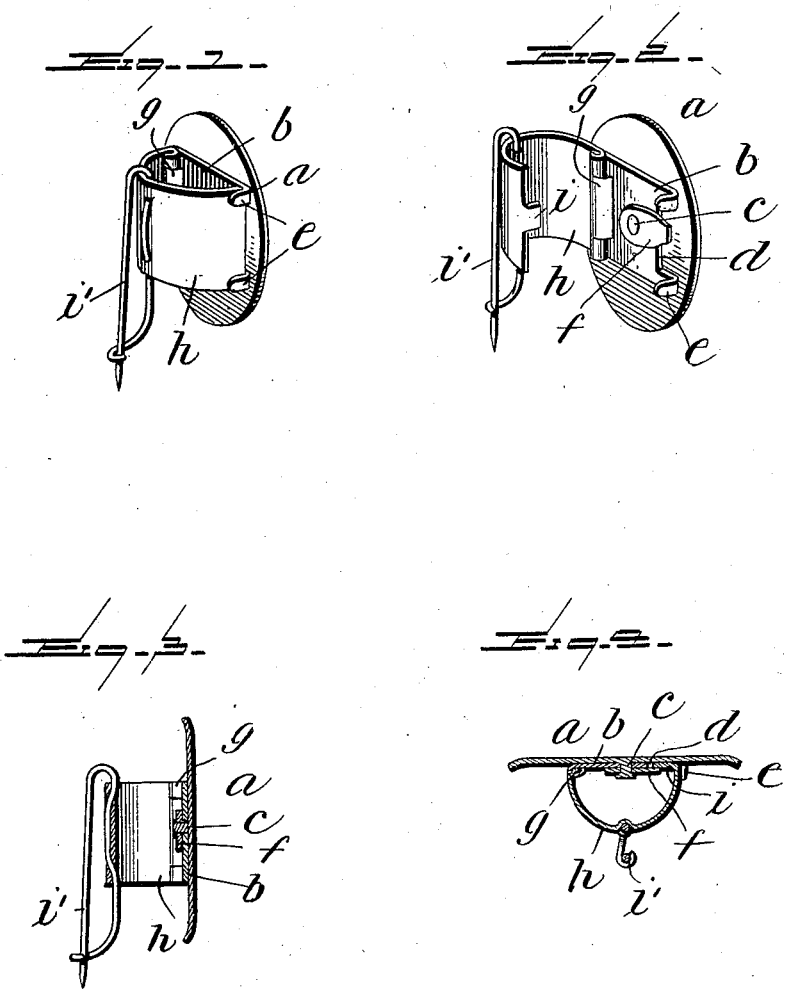
WITNESSES
Wm F. Doyle.
E. R. Rupfunt.
INVENTOR
Ashbel P. W. Neithercott
BY
Watson E. Coleman Attorney No. 726,975. Patented May 5, 1903.

UNITED STATES PATENT OFFICE.

ASHBEL PARSONS WILLARD NEITHERCOTT, OF VANBUREN, INDIANA.

COMBINED BADGE AND BOUTONNIÈRE-HOLDER.

SPECIFICATION forming part of Letters Patent No. 726,975, dated May 5, 1903.

Application filed July 30, 1902. Serial No. 117,679. (No model.)

*To all whom it may concern:*

Be it known that I, ASHBEL PARSONS WILLARD NEITHERCOTT, a citizen of the United States, residing at Vanburen, in the county of Grant and State of Indiana, have invented certain new and useful Improvements in a Combined Badge and Boutonnière-Holder, of which the following is specification.

This invention relates to a combined badge and boutonnière-holder, and has for its object the providing of a device of the character set forth which is inexpensive and simple in construction, ornamental, and easy of operation and which can be quickly and securely attached to wearing-apparel.

The invention consists of the construction and arrangement of the parts, as will be more fully hereinafter described and claimed.

In the drawings, Figure 1 is a side view of the improved device as closed. Fig. 2 is a side view of the device as open. Fig. 3 is a longitudinal sectional view of the improved device, and Fig. 4 is a horizontal cross-section thereof.

Letters of reference are used to indicate corresponding parts.

Referring to the drawings, $a$ represents a badge, button, or fraternal emblem which turns freely on the stem of part $c$, as shown. $b$ is a plate, the edge of which is cut out, as shown at $d$, leaving two prongs or ends $e$, which are curved upward and stand at right angles with said plate. The badge, button, or emblem is rigidly secured to one end of part $c$, and to the other end is rigidly secured a dog $f$. Secured by hinge $g$ to the plate $b$ is a U-shaped piece $h$, which may be of any suitable material, preferably metal. Projecting from the outer or loose end of the U-shaped piece is a prong or tongue $i$ and at right angles therewith and which when the same is closed down upon the plate $b$ engages with the dog $f$ and holds the same securely in place, the plate $b$ and the U-shaped piece forming the boutonnière-holder.

When it is desired to open the holder, the badge or button is slightly turned. The dog $f$, being rigidly secured to the stem of part $c$, turns with the badge or button $a$, thus releasing the outer end of the U-shaped piece, which is turned back on the hinge $g$. The boutonnière can then be put in place and the holder closed down upon it and fastened, as shown.

To the back of the U-shaped piece $h$ is secured, by any desirable means, a pin $j$, preferably an ordinary safety-pin, which said pin attaches the combined badge and boutonnière-holder to the garment upon which it is to be worn.

The advantages of this device consist in its simplicity of construction, durability, and the ease with which it can be adjusted, together with its adaptability for ornamentation.

Having thus described my said invention, what I claim as new, and desire to secure by Letters Patent, is—

1. A device of the character described consisting of a badge provided with a stem, a plate with an oblong opening formed by the cutting out of a piece thereof leaving two prongs which are turned upward, and are at right angles with the surface of the plate, a dog secured to the end of the stem, and a U-shaped piece hinged to the plate at one end having an inwardly-inclined prong engaging with the dog, substantially as and for the purposes described.

2. A device of the character described consisting of a badge and a dog secured to the opposite ends of a stem, a plate on said stem and interposed between the badge and dog and having its edges cut out so as to leave an oblong opening therein with two prongs standing at right angles with the plate, a U-shaped piece hinged to one end of said plate, and having a prong projecting inwardly from the other end of said U-shaped piece and engaging with the dog, and a pin secured to the back of the U-shaped piece, substantially as and for the purposes described.

3. A device of the character described consisting of a U-shaped piece hinged at one end to a plate, a pin secured to the back of the U-shaped piece, means for engaging the outer end of the U-shaped piece with a dog secured to the stem of a rivet passing through the center of the plate, and a badge secured to the other end of the stem, substantially as and for the purposes described.

4. A device of the character described consisting of the badge $a$ having the stem $c$, a dog $f$ attached to the end of said stem, plate $b$ interposed between the dog $f$ and the badge, a U-shaped piece $h$ hinged to the plate $b$ and having a prong at the outer end engaging with the dog $f$, and a pin secured to the back of the U-shaped piece, substantially as and for the purposes described.

In testimony whereof I affix my signature in presence of two witnesses.

ASHBEL PARSONS WILLARD NEITHERCOTT.

Witnesses:
L. B. FARRAR,
H. D. NICEWANGER.